(No Model.)

W. S. WELSH.
CHECK VALVE.

No. 491,957. Patented Feb. 14, 1893.

WITNESSES:
H. M. Plaisted
Fred Ernest

INVENTOR
William S. Welsh.
BY H. A. Toulmin,
HIS ATTORNEY.

UNITED STATES PATENT OFFICE.

WILLIAM S. WELSH, OF SPRINGFIELD, OHIO, ASSIGNOR TO THE MAST, FOOS & COMPANY, OF SAME PLACE.

CHECK-VALVE.

SPECIFICATION forming part of Letters Patent No. 491,957, dated February 14, 1893.

Application filed July 29, 1892. Serial No. 441,627. (No model.)

*To all whom it may concern:*

Be it known that I, WILLIAM S. WELSH, a citizen of the United States, residing at Springfield, in the county of Clark and State of Ohio, have invented certain new and useful Improvements in Check-Valves, of which the following is a specification, reference being had therein to the accompanying drawings.

My invention relates to certain new and useful improvements in check valves, the peculiarities of which will be fully described hereinafter and particularly pointed out and claimed.

Figure 1:
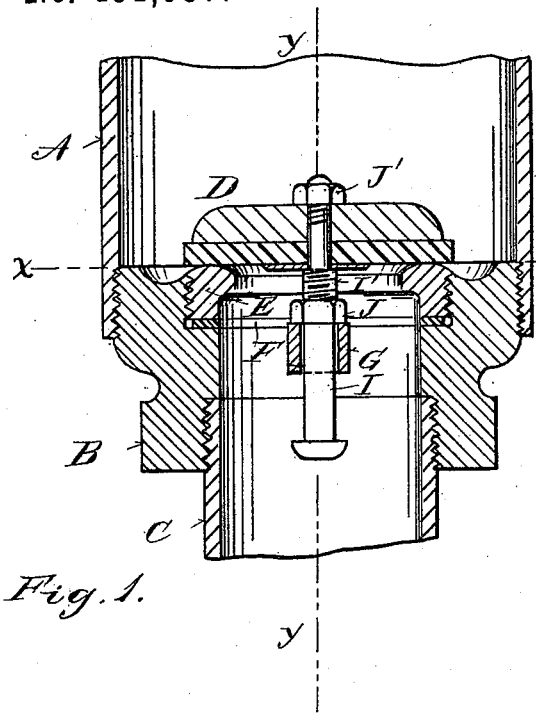
Figure 3:
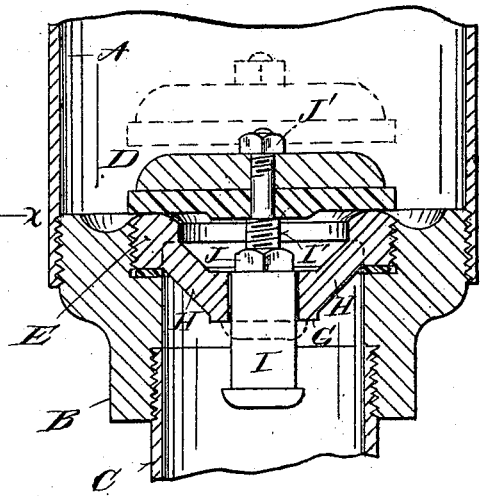
Figure 2:
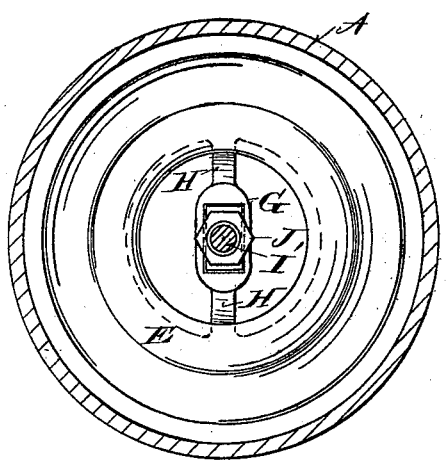

In the accompanying drawings on which like reference letters indicate corresponding parts: Figure 1, represents a vertical sectional view through a valve as applied to a pump cylinder; Fig. 2, a horizontal section on the line x x of Fig. 1, showing a plan view of the valve seat with the valve proper removed; Fig. 3, a similar view to Fig. 1 on the line y y of said figure; and Fig. 4, a bottom view of a valve seat of my construction, detached.

This check valve is particularly adapted for pump cylinders in which the cap is screwed within the cylinder to economize space within the bore of the well. I have illustrated a cylinder A provided with a cap B screwed thereinto, and having a lift pipe C to carry up the water from below. A valve proper D consisting of a circular piece of leather and the usual reinforcing piece above it, is seated on an annulus E forming the valve seat proper, which is screwed or otherwise inserted into a socket in the upper part of the said cap, and provided with a packing ring F, as shown. An angular guiding collar G, preferably rectangular, is hung from the inner zone of the annulus E by arms H. Within the guide is loosely mounted a matching valve stem I having a shoulder at the bottom, or otherwise adapted to limit the lift of the valve proper by engaging with the bottom of the guiding collar, as shown by dotted lines in Fig. 3. Above the rectangular portion of the stem the same is rounded and threaded at I' on which is mounted a nut J for the purpose which will presently appear. The upper end of the stem is also threaded and a top nut J' maintains the parts of the valve proper in their assembled position.

When the leather of the valve proper, or the valve seat itself, becomes defective and requires to be renewed, the nut J' may be readily unscrewed and the valve proper removed. The stem, however, will be supported on the guiding collar by the nut J and thus prevented from dropping down within the pipe C, which it would otherwise do on the removal of the valve, and then the rectangular opening of the guiding collar affords a convenient point of application for a wrench to unscrew the valve seat if so desired.

If the valve proper only is defective the nut J need not be disturbed. Thus the annoyance and trouble of losing the valve stem down the well by carelessness, is avoided. This is a small point apparently, yet of considerable practical importance, since with a person not familiar with the construction of the valve, such an accident would otherwise probably occur with a valve stem not so supported.

The guiding collar is hung below the annulus in order to give more area of discharge, than if it were placed higher within the ring E.

Figure 4:
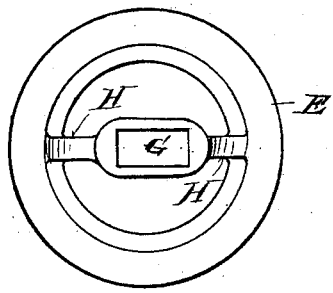

The angular portion of the valve stem is preferably rectangular in section, as shown in Fig. 2, in order to prevent the turning of the stem when the nuts J and J' are removed. This portion may be rectangular and the collar likewise, as shown in Fig. 4, or they may be otherwise matched to prevent the turning of the stem as described.

I lay broad claim to means for maintaining a valve proper in its operative position on the principles hereinbefore described and explained. I do not therefore limit myself to the exact construction herein shown and described for accomplishing this end. I do not claim broadly, however, in this application, a screw-threaded annulus mounted within the socket of a cap and adapted to be readily detached therefrom, since the same is claimed broadly in my application on pump valve seats, filed of even date herewith, Serial No. 440,885.

While the valve stem is shown rounded on top, it may be otherwise shaped, according to circumstances.

Having thus fully described my invention, what I claim as new, and desire to secure by Letters Patent, is—

1. As an improvement in check valves, the combination with a cylinder cap having an enlarged screw-threaded socket at the upper end of the inlet opening, of a threaded annulus matching said socket and of substantially the size of the inlet opening interiorly, and provided with a central guide with an angular slot, supported from the inner portion of said annulus, a valve proper mounted on said annulus, and a valve stem having an angular portion matching said guide at one end and secured to the valve proper at the other end, substantially as and for the purpose described.

2. As an improvement in check valves, the combination with a cylinder cap having an enlarged annular screw-threaded socket at the upper end of the inlet opening, of a threaded annulus screwed into said opening and of substantially the size of the lift pipe, and provided with a slotted guide-portion centrally supported, of a valve proper, and a valve stem therefor consisting of an angular portion mounted in said slotted guide and having a head to limit its upward movement, a threaded upper end to receive the valve proper, a middle threaded enlarged portion, forming a shoulder for the valve proper, a nut on the upper end to secure the valve proper on said shoulder and a nut corresponding to the enlarged middle portion, to support said stem independently, substantially as and for the purpose described.

In testimony whereof I affix my signature in presence of two witnesses.

WILLIAM S. WELSH.

Witnesses:
OLIVER H. MILLER,
H. M. PLAISTED.